3,133,089
PREPARATION OF GAMMA PYRONES
Robert P. Allingham, Groton, Conn., and Robert L. Miller, Brooklyn, and Herman Rutner, Queens Village, N.Y., assignors to Chas. Pfizer & Co., Inc., New York, N.Y., a corporation of Delaware
No Drawing. Filed June 13, 1962, Ser. No. 202,103
7 Claims. (Cl. 260—345.9)

The present invention relates to a process for the preparation of gamma-pyrones. More particularly it is concerned with an improved process for the preparation of maltol, a gamma-pyrone which is especially useful for its flavor and aroma-enhancing properties.

Until recently, the commercial production of maltol has depended upon difficult and expensive extraction processes involving natural products as, for example, wood. However, as has been disclosed in the copending application of Bryce E. Tate and Robert L. Miller, Serial No. 171,732, filed February 7, 1962, and assigned to the assignee of the instant application, it is now possible to prepare maltol on a commercial scale from a freely available and economical gamma-pyrone, kojic acid.

As is disclosed in the aforesaid application, maltol, 3-hydroxy-2-methyl-4-pyrone, can be obtained from hydroxymaltol, 3-hydroxy-2-hydroxy-methyl-4-pyrone, by a one-step reduction process:

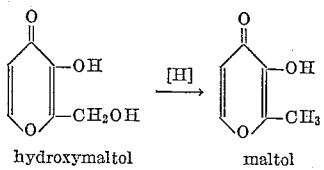

The maximum yields of maltol tend to vary with the reducing means employed. With zinc and hydrochloric acid reducing agent, maltol is obtained in yields of up to 90%; with sodium hydrosulfite reducing agent, maltol is obtained in only about 30% yield and with hydrogen activated by noble metal catalysts maltol is obtained in only about 20% yield. Furthermore, it is found that if zinc and hydrochloric acid is employed as the reducing means there is some tendency for the maltol to be colored red due to the presence of a chelate of maltol with iron; iron seems to be present in small amounts in most samples of zinc employed in commercial reduction operations. This coloration can be removed from the product by a subsequent distillation step to obtain maltol eminently suitable for all food uses.

It has now been surprisingly found in the improved process of the present invention that if instead of being directly reduced to maltol as is described in the said pending application, the hydroxymaltol is first converted to a halomaltol such as, for example 2-chloro-, 2-bromo- or 2 - iodomethyl - 3 - hydroxy - 4 - pyrone (hereinafter designated, respectively, chloromaltol, bromomaltol and iodomaltol), and the halomaltol is then converted to maltol, very high yields of maltol can be obtained by reduction with salts of hydrosulfurous acid or with hydrogen activated by a noble metal catalyst. Furthermore the maltol which is obtained is not contaminated with the aforementioned iron chelate because it is not necessary, nor even desirable, in this instance to employ a metal-acid reducing means. As a result of the application of the improved process of this invention, therefore, maltol is obtained in a form which can be employed directly, without further purification steps, in all food uses.

It is known to the art that maltol can be made from hydroxymaltol by proceeding through a halomaltol intermediate. Thus, Stodola in volume 73, Journal of the American Chemical Society, pages 5912–13, 1951, and Shemyakin, et al. in volume 47, Chemical Abstracts, page 4292, 1953, both disclose such a process. However the prior art processes involve the use of expensive thionyl chloride and chloroform to prepare chloromaltol and zinc and acetic acid reducing means to prepare maltol. As has been mentioned before, this reducing means requires an additional purification step to obtain maltol suitable for food use.

The improved process of the instant invention is distinguished from the Stodola and Shemyakin, et al. process in that relatively inexpensive hydrogen halide reactants may be used and the improved reducing means insures that the maltol ultimately obtained is suitable for use directly in food.

It is accordingly an object of the present invention to provide an improved means for obtaining maltol from gamma-pyrone intermediates.

It is a further object of the present invention to eliminate a purification step usually required to obtain maltol free of chelated iron.

These and other objects may be readily achieved by application of the improved process of the instant invention which comprises treating hydroxymaltol with a reagent selected from the group consisting of hydrogen chloride, hydrogen bromide and hydrogen iodide to form a compound of the formula

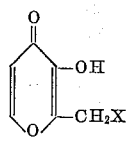

wherein X is selected from the group consisting of chloro, bromo and iodo and treating said compound with a reagent selected from the group consisting of hydrosulfurous acid, alkali metal salts of hydrosulfurous acid, alkaline earth metal salts of hydrosulfurous acid, zinc hydrosulfite, ammonium hydrosulfite and hydrogen activated by a noble metal catalyst to form maltol.

Of course, as is well known to those skilled in the art, hydrosulfurous acid ($H_2S_2O_4$, hyposulfurous acid, dithionous acid) is a relatively unstable material. For this reason it is preferred, in the practice of the process of the instant invention, to use this reducing agent in the form of the alkali metal or alkaline earth metal salt derivatives of hydrosulfurous acid, zinc hydrosulfite or ammonium hydrosulfite.

The hydroxymaltol starting material may be readily prepared from commercially-available kojic acid as is described in said copending application, S.N. 171,732.

The preparation of the halomaltol according to the improved process of the present invention may be carried out by the following general procedure: Hydroxymaltol is dissolved in from about 2 to about 6 parts by weight of solvent such as, for example, glacial acetic acid, chloroform, and the like, and the solution is treated with gaseous hydrogen halide. The reaction temperature has a tendency to rise spontaneously within several minutes from 25° C. to about 60° C. While the reaction will go to completion within about 6 to 8 hours if the mixture is maintained at about 60° C. by application of an external heating means, it is preferred to raise the temperature to from about 100° to about 120° C. whereupon the reaction is usually complete in about 1 to 2 hours.

The solvent to be employed in the formation of the halomaltol intermediate is not particularly critical to the invention although it should be relatively inert to the hydrogen halide reactant, and to the halomaltol intermediate, and hydroxymaltol should be at least moderately soluble in said solvent. Particularly effective solvents are acetic acid, formic acid and chloroform. Acetic acid is preferred since it is relatively inexpensive and can be heated to the preferred temperatures at atmospheric pressure; chloroform, having a lower boiling point, can be used in a pressure vessel.

The hydrogen halides may be introduced as gases into the reaction mixture by means well known to the art. It is particularly convenient to minimize losses of reagents especially in large-scale reactions to introduce the hydrogen halide into the reactor under low to moderate pressure, adding hydrogen halide as necessary to replace that which reacts.

It is found that the addition of a small amount of strong acid such as sulfuric or phosphoric to the reaction mixture tends to afford higher yields of chloromaltol when hydrogen chloride is used to treat hydroxymaltol. Amounts of acid of from about 0.1 to about 0.5% by weight of hydroxymaltol are sufficient to achieve this effect, the reason for which is not clearly understood at this time. Such an effect has not been observed when hydrogen bromide or hydrogen iodide are used; nearly quantitative yields of the corresponding halomaltols are obtained in 1-2 hours in the absence of added acid.

The halomaltol is isolated by cooling the reaction mixture from the temperature of the reaction, which is usually about 110-120° C., to about 15-25° C. whereupon the halomaltol crystallizes from solution. The product is removed by filtration and is dried in the air.

With respect to the reduction of the halomaltol to maltol, this can be carried out in good yield by treating a solution of halomaltol with an alkali metal hydrosulfite such as sodium or potassium hydrosulfite, and the like, or with an alkaline earth metal hydrosulfite such as calcium or magnesium hydrosulfite, and the like, or with zinc hydrosulfite or ammonium hydrosulfite. Alternatively, hydrogen gas in the presence of a noble metal catalyst such as finely divided platinum, palladium and platinum oxide or palladium or platinum suspended on supports such as carbon or charcoal, and the like, may be used.

The solvent employed in the reductions employing alkaline hydrosulfite reducing means is not critical to the invention so long as it is relatively inert to the reagents. It is particularly convenient to employ water as a solvent. With the hydrogen activated by a noble metal catalyst reducing means, solvents commonly employed in the art of moderate-pressure catalytic hydrogenation can be used. Especially suitable for this purpose are acetic acid and lower alkanols such as methanol, and the like. Especially preferred because highest yields are obtained in this medium is acetic acid.

The general procedure for reduction of haolmaltol with alkaline hydrosulfites according to the improved process of the present invention is as follows:: About 1.6 moles of the alkaline hydrosulfite is dissolved or suspended in about 10 volumes of water and to this is added about one equivalent or halomaltol during about 30 minutes. During the addition, sufficient 10 N sodium hydroxide solution is added to maintain the pH of the reaction mixture at 5-5.5. At the end of the halomaltol addition, the reaction mixture is stirred for about 30 minutes, then is heated to about 90° C., and a small amount of insoluble material is removed by filtration. Maltol is recovered by cooling the filtrate to about 15° C. whereupon the product precipitates. The crystals are removed by filtration and are dried in air.

With respect to the reduction of halomaltol with hydrogen activated by a noble metal catalyst, the following procedure may be employed:

The halomaltol is suspended in from about 50 to about 200 parts by weight of solvent such as, for example, glacial acetic acid or methanol and to this mixture is added about 2.5% by weight of metal based on the halomaltol of a noble metal catalyst such as, for example, a 5% palladium on carbon catalyst. There is then added an amount of base such as triethylamine or ammonium acetate equivalent to the halomaltol and hydrogen is introduced to the suspension up to an initial pressure of from about 25 to about 100 pounds per square inch. The suspension is shaken and the hydrogen pressure is observed to fall to a nearly constant level, corresponding approximately to the number of equivalents of halomaltol taken within about 15 to about 5 minutes. The maltol can be recovered by filtering the reaction mixture to remove the catalyst and evaporating off the solvent. The maltol which remains as a residue may be further purified by recrystallization from water.

The following examples are illustrative of the improved process of the present invention.

*Example I*

Hydroxymaltol, 11.36 g., 0.08 mole, is added to 25 ml. of glacial acetic acid in a 50 ml. flask equipped with thermometer, stirrer, gas inlet tube and reflux condenser. Anhydrous hydrogen chloride gas is introduced to the stirred mixture and the temperature is observed to rise from 25° C. to 60° C. within 2 minutes. External heating is applied to increase the temperature to 110° C. and this temperature is maintained while gas is added for an additional 120 minutes. The mixture is allowed to cool to 25° C. and the finely divided solid product which precipitates is removed by filtration. The chloromaltol is extracted from the solid product with about 10 parts by weight of boiling acetone. Evaporation of the extract yields chloromaltol; this is purified by recrystallization from chloroform. There is obtained 2.46 g., M.P., 146-147° C., a 19% yield of theoretical.

The procedure is repeated this time adding 5 drops of concentrated sulfuric acid to the reaction mixture. There is obtained chloromaltol, 9.31 g., M.P., 149-149.2° C., a yield of 74% of theoretical.

*Example II*

Hydroxymaltol, 28.4 g., 0.2 mole, is added to 62.5 ml. of acetic acid. The stirred mixture is heated in an oil-bath and gaseous hydrogen bromide is added. The mixture becomes homogeneous when the temperature reaches 100° C. and after the temperature reaches 117° C., it is maintained at this temperature for an additional hour. The gas addition is stopped, heating is discontinued and the mixture is allowed to cool to 25° C. The solid material which precipitates is removed by filtration and is dried in a desiccator. There is obtained 32.3 g. of bromomaltol, M.P., 150° C. An additional 6.0 g., M.P., 147-149° C., is obtained by concentration of the filtrate to about one-third volume and filtration of the crystalline precipitate. The solids are combined and recrystallized from about 25 parts by weight of acetic acid. There is obtained a total of 34.7 g. of bromomaltol, a yield of 84.6% of the theoretical, M.P., 170° C.

*Example III*

The procedure of Example I is repeated substituting anhydrous hydrogen iodide for the corresponding hydrogen chloride. The reaction is carried out in the absence of a sulfuric acid promoter. There is obtained iodomaltol in good yield.

*Example IV*

Sodium hydrosulfite, 1180 g., is dissolved in 11.4 liters of water then 728 g. of chloromaltol is added gradually during 20 minutes and a total of 408 ml. of 10 N NaOH is added to maintain a pH of 5-5.5. The temperature gradually rises from 24 to 38° C. At the end of the chloromaltol addition, an additional 100 grams of sodium hydrosulfite is added and the mixture is stirred for ½ hour. The suspension then is heated to 91° C. and a small amount of insoluble matter is removed by filtration. The solution is cooled to 15° C. and the maltol which crystallizes, is removed by filtration and is dried in vacuo. Additional maltol is recovered by extracting the aqueous filtrate with four 3.5-liter portions of chloroform. The chloroform extracts are combined and are concentrated under a vacuum of about 200 mm. Hg to yield an additional crop of maltol which is isolated. The combined total yield of maltol is 70.3% of the theoretical. The first crop product melts at 162–3° C., and is 99% pure by ultraviolet spectrophotometric assay.

The procedure is repeated substituting for the sodium hydrosulfite the following salts: lithium hydrosulfite, potassium hydrosulfite, calcium hydrosulfite, zinc hydrosulfite, magnesium hydrosulfite and ammonium hydrosulfite. Substantially the same results are obtained.

*Example V*

Chloromaltol, 1.61 g., 0.01 mole, is suspended in 200 ml. of methanol and 3.0 g., of a 5% palladium on carbon catalyst (taken as a 50% suspension in water) and 1.01 g., 1.38 ml., 0.01 mole, of triethylamine are added. The suspension is shaken in a hydrogenation apparatus under a hydrogen atmosphere at an initial pressure of 50 pounds per square inch. The pressure drops to 28.5 pounds per square inch within 30 seconds, then the pressure drop ceases and no further drop in pressure is observed to occur within the next 5 minutes. The reaction mixture is filtered, the filtrate is evaporated to dryness, the residue is suspended in 10 ml. of water, heated until it is dissolved and then the solution is allowed to cool at 5° C. for 12 hours. The crystals which precipitate are removed by filtration, and the filtrate is extracted with 3 volumes of chloroform. The chloroform extracts are evaporated and the crystalline residue is combined with the first precipitate. There is obtained maltol, 0.862 g., a yield of 68.5% of the theoretical, M.P., 159–160° C.

The procedure is repeated substituting glacial acetic acid for methanol. The pressure drops to a constant value within about 2 minutes. There is obtained a total of 1.00 g. of maltol, M.P., 158–160° C., a yield of 79.4% of theory.

*Example VI*

Bromomaltol, 2.05 g., 0.01 mole, is suspended in 50 ml. of glacial acetic acid and to this are added triethylamine, 1.2 ml., and 2.05 g. of a 5% palladium on carbon catalyst (taken as a 50% aqueous suspension). The suspension is shaken under a hydrogen atmosphere at an initial pressure of 50 pounds per square inch; after 45 minutes the pressure has dropped about 7 pounds per square inch and becomes constant. The mixture is filtered to remove catalyst residue and the solvent is evaporated at a pressure of about 15 mm. of Hg. The residue is dissolved in 10 ml. of hot water and is filtered. The filtrate is allowed to crystallize at 5° C. and the crystals are collected by filtration. There is obtained 0.5814 g. of maltol, M.P., 157–160° C. Extraction of the filtrate with 5 volumes of chloroform and evaporation of the chloroform yields an additional 0.2184 g. of maltol, M.P., 157–160° C. The first crop yield of maltol is 46% of theoretical.

The procedure is repeated substituting the folowing catalysts for palladium on carbon on an equal weight based on the metal basis: platinum black, palladium black, platinic oxide, and platinum on carbon. Substantially the same results are obtained.

*Example VII*

The procedure of Example IV is repeated substituting iodomaltol for chloromaltol on an equimolar basis. Maltol is isolated in good yield.

What is claimed is:

1. An improved process for the preparation of maltol from hydroxymaltol which comprises treating hydroxymaltol with a reagent selected from the group consisting of hydrogen chloride, hydrogen bromide and hydrogen iodide to form a compound of the formula

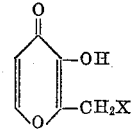

wherein X is selected from the group consisting of chloro, bromo and iodo and treating said compound with a reducing agent selected from the group consisting of alkali metal salts of hydrosulfurous acid, alkaline earth metal salts of hydrosulfurous acid, zinc hydrosulfite, ammonium hydrosulfite and hydrogen activated by a noble metal catalyst to form maltol.

2. A process as in claim 1 wherein said substituent X is chloro.

3. A process as in claim 1 wherein said substituent X is bromo.

4. A process as in claim 1 wherein said reducing agent is sodium hydrosulfite.

5. A process as in claim 1 wherein said noble metal catalyst is palladium.

6. An improved process for the preparation of maltol from hydroxymaltol which comprises treating hydroxymaltol with hydrogen chloride to form chloromaltol and treating said chloromaltol with sodium hydrosulfite to form maltol.

7. A process which comprises treating chloromaltol with sodium hydrosulfite to form maltol.

No references cited.